United States Patent
Mourot et al.

(10) Patent No.: US 12,502,858 B2
(45) Date of Patent: Dec. 23, 2025

(54) METHOD FOR MANUFACTURING A COMPOSITE BLADE FOR A TURBINE ENGINE, THE BLADE COMPRISING A REINFORCING SHIELD FOR BALANCING THE BLADE

(71) Applicant: SAFRAN AIRCRAFT ENGINES, Paris (FR)

(72) Inventors: Maxime Mathieu Mourot, Moissy-Cramayel (FR); Lucas Antoine Christophe Lauwick, Moissy-Cramayel (FR); Julien Trebaol, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 117 days.

(21) Appl. No.: 18/571,057

(22) PCT Filed: Jun. 16, 2022

(86) PCT No.: PCT/FR2022/051176
§ 371 (c)(1),
(2) Date: Dec. 15, 2023

(87) PCT Pub. No.: WO2022/269174
PCT Pub. Date: Dec. 29, 2022

(65) Prior Publication Data
US 2024/0293988 A1   Sep. 5, 2024

(30) Foreign Application Priority Data

Jun. 21, 2021 (FR) ..................... 2106574

(51) Int. Cl.
*B29C 65/00* (2006.01)
*B29D 99/00* (2010.01)
(Continued)

(52) U.S. Cl.
CPC .......... *B29D 99/0025* (2013.01); *B29C 65/00* (2013.01); *B29C 65/48* (2013.01);
(Continued)

(58) Field of Classification Search
CPC ....... B29C 65/00; B29C 65/48; B29C 65/544; B29C 65/70; B29C 65/7832; B29C 66/00145
See application file for complete search history.

(56) References Cited

U.S. PATENT DOCUMENTS 3,687,721 A    8/1972  Dardoufas
7,805,839 B2 * 10/2010 Cammer ................ F01D 5/147
                                                29/889.23
(Continued)

FOREIGN PATENT DOCUMENTS

CA     2999360 A1    4/2017
CA     3009226 A1    6/2017
(Continued)

OTHER PUBLICATIONS

International Search Report and Written Opinion received for PCT Patent Application No. PCT/FR2022/051176, mailed on Oct. 6, 2022, 17 pages (8 pages of English Translation and 9 pages of Original Document).

*Primary Examiner* — Philip C Tucker
*Assistant Examiner* — Nickolas R Harm
(74) *Attorney, Agent, or Firm* — WOMBLE BOND DICKINSON (US) LLP

(57) ABSTRACT

A method for manufacturing a blade made of a composite material for a turbine engine, in particular a turbine engine of an aircraft, wherein a reinforcing shield is attached to one edge of an airfoil, the shield having a generally elongated shape along an elongation axis of the airfoil. The shield includes at least one excess dimension so as to be able to
(Continued)

adjust the moment weight of the blade along the axis according to the position of the shield on the edge of the axis, and the method includes a step for removing a surplus portion of the shield so s to balance the blade.

10 Claims, 4 Drawing Sheets

(51) Int. Cl.
    *B29C 65/48*     (2006.01)
    *B29C 65/54*     (2006.01)
    *B29C 65/70*     (2006.01)
    *B29C 65/78*     (2006.01)
    *F01D 5/14*     (2006.01)

(52) U.S. Cl.
    CPC ............ *B29C 65/544* (2013.01); *B29C 65/70* (2013.01); *B29C 65/7832* (2013.01); *B29C 66/00145* (2013.01); *F01D 5/147* (2013.01); *F05D 2220/36* (2013.01); *F05D 2230/10* (2013.01); *F05D 2230/60* (2013.01)

(56) References Cited

U.S. PATENT DOCUMENTS

| | | | | |
|---|---|---|---|---|
| 8,807,931 | B2* | 8/2014 | Roberts | F01D 5/147 |
| | | | | 428/296.7 |
| 9,429,026 | B2* | 8/2016 | Schreiber | F01D 5/30 |
| 9,963,971 | B2* | 5/2018 | Franchet | F04D 29/023 |
| 10,294,573 | B2* | 5/2019 | Parkos, Jr. | C25D 1/02 |
| 10,487,843 | B2* | 11/2019 | Drozdenko | F04D 29/644 |
| 2009/0074586 | A1 | 3/2009 | Le Hong et al. | |
| 2012/0163981 | A1* | 6/2012 | Hong | B29C 73/26 |
| | | | | 156/278 |
| 2016/0001407 | A1* | 1/2016 | Hansen | F01D 5/288 |
| | | | | 29/889.71 |
| 2017/0081752 | A1* | 3/2017 | Hanley | B29C 64/153 |
| 2018/0045216 | A1* | 2/2018 | Karlen | F04D 29/023 |
| 2018/0274375 | A1 | 9/2018 | Notarianni et al. | |
| 2019/0003312 | A1 | 1/2019 | Pouzadoux et al. | |

FOREIGN PATENT DOCUMENTS

| | | | | |
|---|---|---|---|---|
| EP | 2037082 | A1 | 3/2009 | |
| FR | 2046557 | A5 | 3/1971 | |
| FR | 3046557 | A1 * | 7/2017 | ................ B22F 7/08 |

* cited by examiner

[Fig.1]
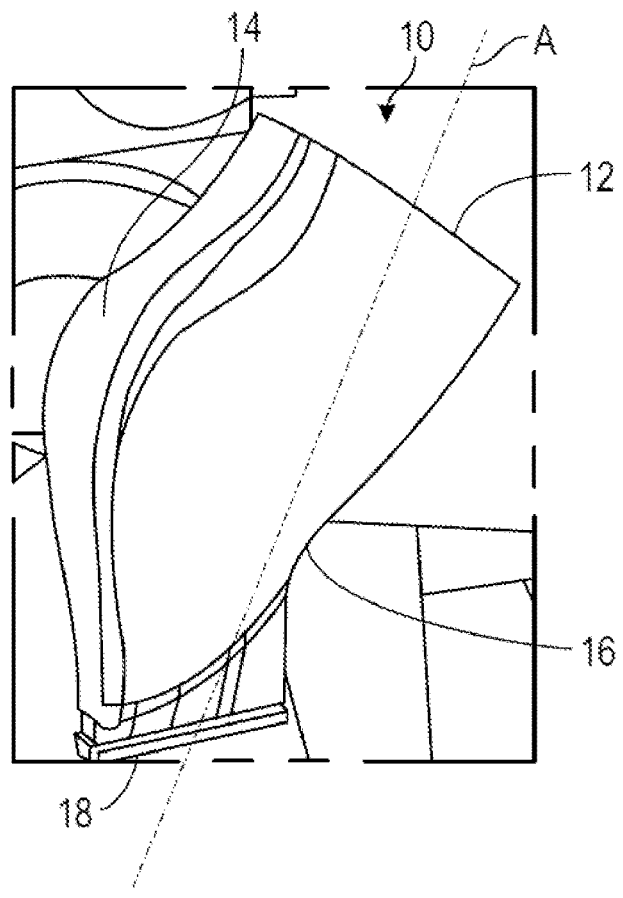
[Fig.2]
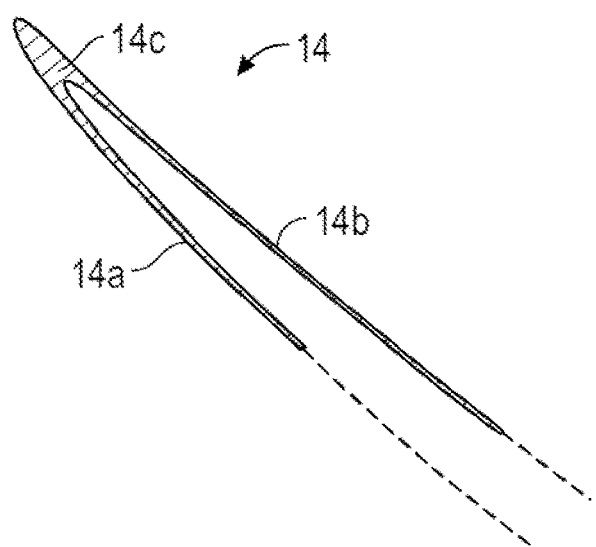

[Fig.3]
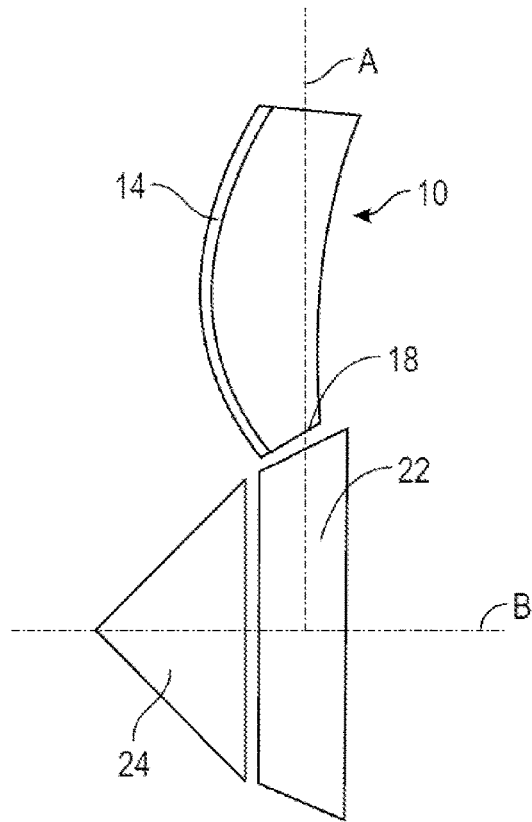
[Fig.4]
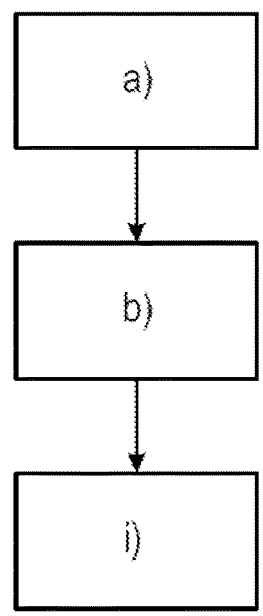

[Fig.5]
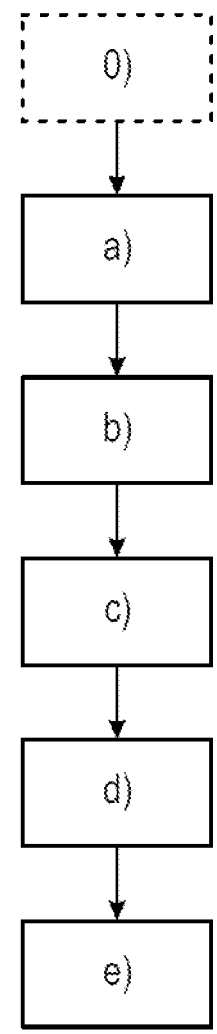

[Fig.6a-6d]
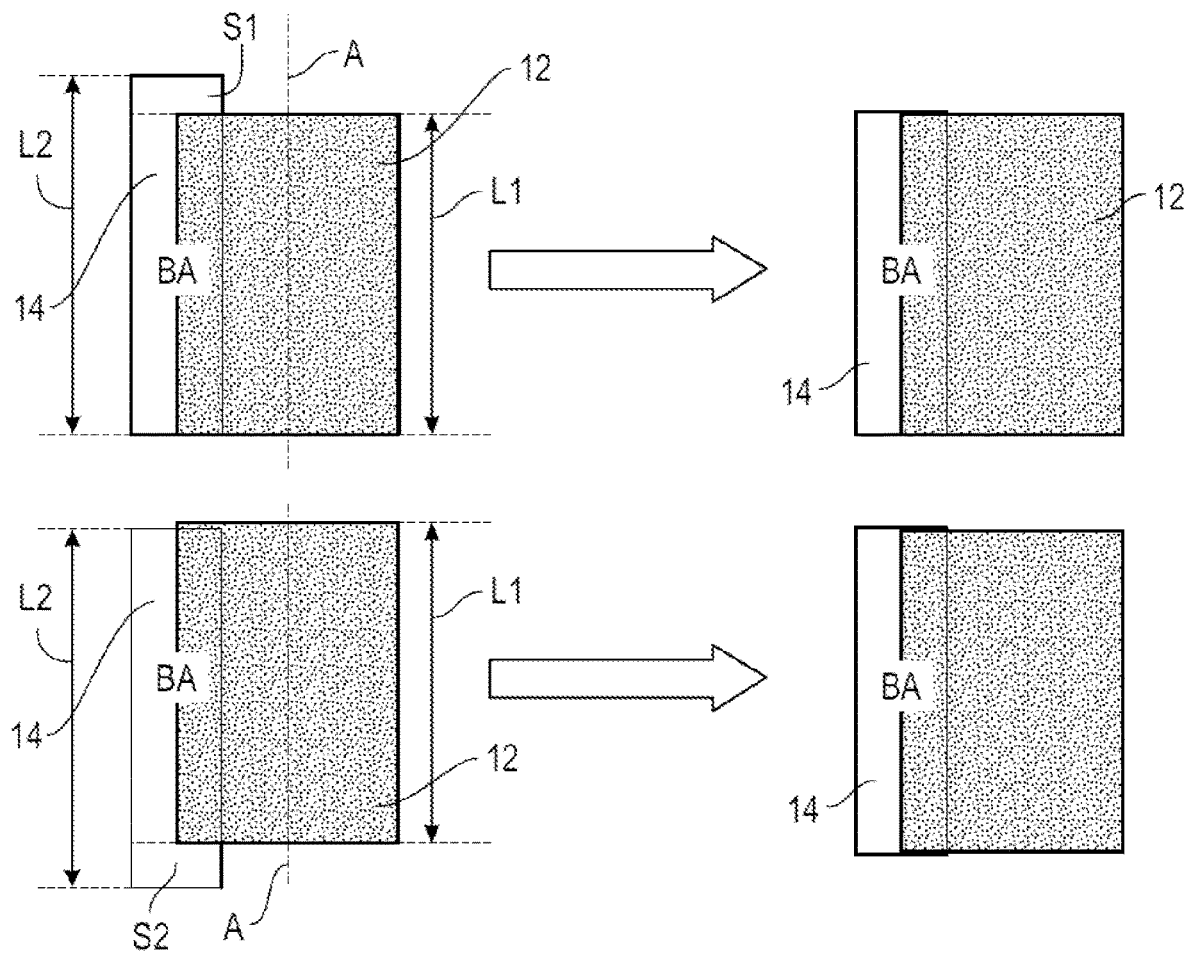

METHOD FOR MANUFACTURING A COMPOSITE BLADE FOR A TURBINE ENGINE, THE BLADE COMPRISING A REINFORCING SHIELD FOR BALANCING THE BLADE

TECHNICAL FIELD OF THE INVENTION

This invention relates to a method for manufacturing a vane made of a composite material for a turbine engine, in particular, for an aircraft, as well as a method for assembling a turbine engine module, such as a fan module.

TECHNICAL BACKGROUND

The technical background comprises the documents CA-A1-2999 360, CA-A1-3 009 226 and EP-A1-2 037 082.

An aircraft turbine engine comprises one or more propellers, which may be ducted or unducted. The present invention applies in particular to the blades of a fan, i.e., the blades of a ducted propeller, but also to other types of propellers, such as the unducted propellers of turboprops, for example.

A turbine engine propeller is crossed by an air flux and its vanes can be damaged by wear or impact, for example of the FOD type (Flying Object Damage) caused by the impact of a bird on the vanes for example.

This invention relates to the manufacture of a vane made of a composite material, for example an organic matrix (OMC), at least one edge of which is reinforced by a reinforcing shield.

A composite vane is formed from a woven preform embedded in a polymer matrix (of the epoxy type, for example). The preform is obtained by three-dimensional weaving of fibres, usually carbon.

It is known to reinforce the leading edge of this vane with an added-on metallic shield. The shield, as described in the application FR-A1-2046 557, comprises two lateral wings extending respectively over a pressure side and a suction side of the blade, and a nose connecting the two wings.

These composite vanes can be fitted to a turbine engine module such as a fan module. A fan module comprises a rotor disc on which the vanes are mounted. This type of module must be balanced to eliminate or reduce any imbalance. Balancing is typically achieved by attaching and securing flyweights to the module, these flyweights having predetermined masses and being precisely positioned to compensate for the aforementioned imbalance.

The centrifugal flyweights are attached to the fan disc or cone, allowing the radial moment weight of the complete module to be adjusted. There is currently no solution for adjusting this parameter on the individual blades.

The moment of a force relative to a given point is a physical vector quantity that expresses the ability of this force to cause a mechanical system to rotate about this point. In the context of the invention, the force depends mainly on the mass of a vane. The moment of the force considered for balancing therefore depends on the weight and is referred to as "moment weight". The projection of this moment onto the longitudinal axis of the vane, which is generally a radial axis (relative to the axis of rotation of the fan and vane), is called the "radial moment weight". It is an algebraic scalar quantity expressed in the same unit as the moment weight.

The radial moment weight of the fan vanes is a critical parameter in terms of the service life of the fan disc and fan vanes or the balancing of the complete vane set. It is therefore in our interest to reduce the dispersion of production on this parameter. In order to improve the radial moment weight capability of the vane, it would be useful to be able to vary the mass of each of the vanes by approximately +/−15 g in one particular embodiment.

The present invention provides a simple, effective and economical solution to the above need.

SUMMARY OF THE INVENTION

The present invention provides a method for manufacturing a vane made of composite material for a turbine engine, in particular an aircraft, comprising the steps of:
a) and b) preparing a blade based on fibres embedded in a resin, the blade comprising a suction side and a pressure side extending between a leading edge and a trailing edge,
c) attaching a reinforcing shield to an edge of the blade, this shield having a generally elongate shape along an axis of elongation of the blade,
characterised in that the shield attached in step c) comprises at least one excess dimension so as to be able to adjust the moment weight of the vane along said axis according to the position of the shield on the edge along that axis, and in that the method comprises a subsequent step d) of removing a surplus portion of the shield.

The invention thus enables the moment weight, in particular the radial moment weight, of a vane to be adjusted before it is fitted into a module, for example a fan module. This allows the vanes to be balanced before the module is assembled. This eliminates the need to balance the complete module and therefore avoids the use of balancing flyweights, which is particularly advantageous.

In general, the blades of the vanes have complex profiles, usually twisted and curved. The shields have shapes configured to adopt those of the blades and can each have a section evolving in longitudinal direction. It is therefore understood that the moment weight of the vane is affected by the positioning of the shield on the edge, along the aforementioned axis.

The shield generally has a length that is a function of, and in particular is equal to, the length or longitudinal dimension of the edge on which the shield is mounted. The excess dimension of the shield, particularly in terms of length, allow the shield to be positioned in different longitudinal positions on the edge, which will therefore always be covered by the shield, whatever the position of the shield, as will be explained in more detail below.

The method according to the invention may comprise one or more of the following characteristics and/or steps, taken alone or in combination with each other:
steps a) and b) respectively comprise:
a) weaving of fibres in three dimensions to obtain a fibrous preform, and
b) mounting of the preform in a mould and injecting resin into this mould, so as to obtain a blade comprising a suction side and a pressure side extending between a leading edge and a trailing edge,
steps a) and b) comprise the stacking of fibre plies or mats, which are previously or subsequently impregnated with a resin;
said excess dimension is an extra length of the shield;
said surplus portion is a longitudinal surplus portion of the shield;
the surplus portion is located at a lower or radially internal end of the blade, or at an upper or radially external end of the blade;

the method comprises a preliminary step o) of studying the impact of the position of the shield on the edge of the blade, along said axis, on the moment weight of the vane along this axis;

said surplus portion is removed by machining the shield.

The present invention also relates to a method of assembling a turbine engine module, such as a fan module, comprising a step of e) mounting a plurality of vanes on a rotor disc, each of the vanes being manufactured by a method as described above. The assembly comprising the rotor disc and the vanes forms a wheel.

Advantageously, the method does not include a balancing step for the module, and in particular the wheel, after the vanes have been mounted on the disc.

BRIEF DESCRIPTION OF THE FIGURES

Further characteristics and advantages of the invention will become apparent from the following detailed description, for the understanding of which reference is made to the attached drawings in which:

FIG. 1 is a schematic perspective view of a turbine engine propeller vane, and in particular of a turbine engine fan, FIG. 2 is a schematic cross-sectional view of a shield of a vane such as that shown in FIG. 1, FIG. 3 is a very schematic view of a fan module of an aircraft turbine engine, FIG. 4 is a flow chart showing the steps in a method for assembling a turbine engine module, according to the technique prior to the invention;

FIG. 5 is a flow chart showing the steps in a method for assembling a turbine engine module according to the invention; and FIGS. 6a to 6d are highly schematic views of a composite vane, during steps of a first embodiment of a method according to the invention for FIGS. 6a and 6b, and during steps of a second embodiment of a method according to the invention for FIGS. 6c and 6d.

DETAILED DESCRIPTION OF THE INVENTION

FIG. 1 shows a propeller vane (10), in particular for the fan of an aircraft turbine engine. This vane 10 comprises an organic matrix composite blade 12 and a metallic shield 14 glued to a leading edge. The blade 12 also comprises a trailing edge 16, opposite the leading edge, and a pressure side and suction side extending between the leading and trailing edges of the blade.

The vane has an axis of elongation noted A which is a radial axis with respect to the longitudinal axis B of the turbine engine in which this vane is mounted (FIG. 3). One longitudinal end of the blade 12 is free and the opposite longitudinal end is connected to a root 18 for attaching the vane to a rotor of the turbine engine.

As can be seen in FIG. 2, the shield 14 comprises two lateral wings 14a and 14b extending respectively over the suction side and the pressure side of the blade 12, and a nose 14c connecting the two wings 14a and 14b.

The wings 14a, 14b define between them a cavity for receiving the leading edge of the blade 12, and adhesive for securing the shield to the blade. The vane 10 can be manufactured by a method comprising the steps of:
a) weaving fibres in three dimensions to produce a fibrous preform,
b) mounting the preform in a mould and injecting resin into this mould, so as to obtain a blade 12 comprising a suction side and a pressure side extending between a leading edge and a trailing edge, and
c) attaching the shield 14 to the edge of the blade.

Alternatively, the vane 10 could be manufactured by stacking fibre plies or fabrics, which are first or subsequently impregnated with a resin. Several variants are conceivable insofar as the composite material of the blade comprises fibres embedded in a resin.

The vanes 10 can be mounted on a rotor disc 22 to form a rotor wheel or a fan rotor, as shown in FIG. 3. In the case of a fan module, the rotor disc 22 comprises vanes 10 at its periphery and may be attached to a cone 24.

The flowchart in FIG. 4 illustrates the steps involved in assembling a fan module using the prior art. Essentially, this method comprises three steps:
a) the manufacture of vanes as described above, with the attachment of a shield, for example by gluing, to the edge of a blade,
b) mounting the vanes on the rotor disc, and finally
i) balancing the module by assessing its imbalance and correcting it using flyweights of predetermined weights, added and attached in specific places on the module (for example on the cone 24).

The flowchart in FIG. 5 illustrates the assembly steps of a module, such as a fan, according to the invention. As can be seen, the last step i) in the method shown in FIG. 4 is eliminated, since there is normally no longer any need to balance the module after the vanes have been mounted on the disc. This is achieved by individually balancing each vane by adjusting its radial moment weight, i.e. its moment weight with respect to the radial axis in relation to the axis of rotation of the vane or module.

Essentially, the method shown in FIG. 5 comprises, in addition to steps a) and b) mentioned above the steps of:
c) and d) gluing the shield to the edge of the blade, this shield being positioned on the edge of the blade and sized according to the radial moment weight of the vane, this step being repeated for each of the vanes in the module,
e) and mounting the vanes on the rotor disc.

Advantageously, and as illustrated in FIGS. 6a to 6d, the shield attached in step c) comprises at least one excess dimension (L2-L1) so that the radial moment weight of the vane can be adjusted as a function of the longitudinal position of the shield on the edge. This excess dimension is quantified according to the balancing to be achieved and may have an equivalent mass of 15 g, for example.

This excess dimension (L2-L1) is preferably made along the longitudinal or radial axis A of the vane and is therefore an extra length, as shown in the drawings. An extra length representing a mass of 15 g can, for example, represent an extra length of 1.5 cm along the axis A in one particular case.

When the position of the shield on the edge is adjusted, it can be understood that this extra length will result in the shield projecting beyond the upper or radially external end of the blade (FIG. 6a-top left in the figure), or beyond the lower or radially internal end of the blade (FIG. 6c-bottom right in the figure), or even both if the blade is, for example, centred with respect to the shield.

The extra length is quantified in such a way that it allows sufficient movement of the shield on the blade to adjust the radial moment weight of the vane, and in such a way that, in each of these positions, the leading edge of the blade is covered and protected by the shield. It is therefore understood that this extra length will be quantified as a function of the maximum conceivable displacement of the shield on the edge, in order to adjust the radial moment weight of the vane.

In FIG. 6a, the radial moment weight of the vane has a minimum value. In FIG. 6c, the radial moment weight of the vane has a maximum value.

Step d), which follows step c) for positioning and gluing the shield 14, consists in removing the surplus portion, in this case longitudinal, of the shield, which should not generally extend beyond the edge of the blade 12. In the case illustrated in FIG. 6b, the surplus portion S1 located at the radially external end of the vane is eliminated. In the case illustrated in FIG. 6d, the surplus portion S1 located at the radially internal end of the vane is eliminated. This elimination can be done by machining.

Before gluing a shield to a blade, it may be useful to study in advance, in step o), the impact of the position of the shield on the edge of the blade, on the radial moment weight of the vane.

The invention enables the radial moment weight of the vanes to be adjusted prior to the assembly of a turbine engine module, which therefore does not necessarily require its own balancing.

The invention claimed is:

1. A method for manufacturing a vane made of composite material for a turbine engine comprising the steps of:
    preparing a blade based on fibres embedded in a resin, the blade comprising a suction side and a pressure side extending between a leading edge and a trailing edge,
    attaching a reinforcing shield to an edge of the blade, said shield having an elongate shape along an axis of elongation of the blade,
    wherein the shield attached in the step of attaching the reinforced shield to the edge of the blade comprises at least one excess dimension so as to be able to adjust the moment weight of the vane along said axis according to the position of the shield on the edge along said axis, and in that the method comprises a subsequent step of removing a surplus portion of the shield.

2. The method according to claim 1, wherein the step of preparing the blade comprises the following steps:
    weaving of fibres in three dimensions to obtain a fibrous preform, and
    mounting of the fibrous preform in a mould and injecting resin into the mould so as to obtain the blade.

3. The method according to claim 1, wherein the step of preparing the blade comprises stacking of fibre plies or mats, which are previously or subsequently impregnated with a resin.

4. The method according to claim 1, wherein said excess dimension is an extra length of the shield.

5. The method according to claim 4, wherein the surplus portion is located at a lower or radially internal end of the blade, or at an upper or radially external end of the blade.

6. The method according to claim 1, wherein said surplus portion is a longitudinal surplus portion of the shield.

7. The method according to claim 1, comprising a preliminary step of studying the impact of the position of the shield on the edge of the blade, along said axis, on the moment weight of the vane along this axis.

8. The method according to claim 1, wherein said surplus portion is removed by machining the shield.

9. A method of assembling a turbine engine module comprising the steps of:
    manufacturing a plurality of vanes made of composite material, the manufacturing of the vanes comprising:
        preparing blades based on fibres embedded in a resin, each blade comprising a suction side and a pressure side extending between a leading edge and a trailing edge,
        attaching a reinforcing shield to an edge of each blade, said shield having an elongate shape along an axis of elongation of the blade, wherein the shield attached in the step of attaching the reinforced shield to the edge of the blade comprises at least one excess dimension so as to be able to adjust the moment weight of the vane along said axis according to the position of the shield on the edge along said axis,
        removing a surplus portion of the shield,
    the method of assembling further comprising the step of:
        mounting the vanes on a rotor disc.

10. The method according to claim 9, wherein the turbine engine module is a fan module.

* * * * *